(12) United States Patent
Dickson

(10) Patent No.: US 6,261,333 B1
(45) Date of Patent: Jul. 17, 2001

(54) AIR FILTER FOR AN INTERNAL COMBUSTION ENGINE HAVING A PRIMARY AIR REGION AND A SECONDARY AIR REGION

(75) Inventor: Gary Dickson, Hampton Bays, NY (US)

(73) Assignee: Diesel Research, Inc., Hampton Bays, NY (US)

( * ) Notice: Subject to any disclaimer, the term of this patent is extended or adjusted under 35 U.S.C. 154(b) by 0 days.

(21) Appl. No.: 09/407,824

(22) Filed: Sep. 28, 1999

Related U.S. Application Data
(60) Provisional application No. 60/142,936, filed on Jul. 9, 1999.

(51) Int. Cl.[7] .......................... B01D 35/30; F02M 35/024; F02M 35/108
(52) U.S. Cl. ............................ 55/385.3; 55/414; 55/502; 55/503; 55/DIG. 19; 123/573
(58) Field of Search .................................. 55/385.3, 413, 55/414, 495, 502, 503, DIG. 19, DIG. 28; 123/573

(56) References Cited

U.S. PATENT DOCUMENTS

| | | |
|---|---|---|
| 2,493,617 | 1/1950 | Chubbuck . |
| 3,172,399 | 3/1965 | Lentz et al. . |
| 3,175,546 | 3/1965 | Roper . |
| 3,277,876 | 10/1966 | Abts . |
| 3,759,015 | 9/1973 | Saxby . |
| 4,272,262 | 6/1981 | Britt et al. . |
| 4,272,263 | 6/1981 | Hancock . |
| 4,713,097 | 12/1987 | Grawi . |
| 4,834,784 | 5/1989 | Bidanset . |
| 5,106,397 | 4/1992 | Jaroszczyk et al. . |
| 5,120,334 | 6/1992 | Cooper . |
| 5,125,940 | 6/1992 | Stanhope et al. . |
| 5,196,653 | 3/1993 | Kiss . |
| 5,383,356 | 1/1995 | Zurek et al. . |
| 5,562,746 | 10/1996 | Raether . |

*Primary Examiner*—David A. Simmons
*Assistant Examiner*—Robert A. Hopkins
(74) *Attorney, Agent, or Firm*—Collard & Roe, P.C.

(57) ABSTRACT

The invention relates to an air filter having a primary air region and a secondary air region separated by a barrier. The primary air region contains a filter element for filtering out particles in the primary air. The secondary air region is designed to receive crankcase emissions sent from an engine's crankcase. Crankcase emissions are a result of gas escaping past the piston rings and into the crankcase due to high pressures in the cylinder during compression and combustion. To aid in removing these gasses from the crankcase, a venturi is enclosed within the housing to increase the negative pressure within the housing and in the secondary air region. This increase in negative pressure draws crankcase emissions out of the crankcase and thus reduces oil and crankcase gas bleeding from the crankcase. In addition, because this venturi is enclosed within this housing, this invention can be used as a compact air filter and crankcase ventilator thus reducing the amount of space and materials needed for these two components.

16 Claims, 6 Drawing Sheets

AIR FILTER FOR AN INTERNAL COMBUSTION ENGINE HAVING A PRIMARY AIR REGION AND A SECONDARY AIR REGION

This invention is based upon provisional application Ser. No. 60/142,936 filed on Jul. 9, 1999.

BACKGROUND OF THE INVENTION

1. Field of the Invention

The invention relates to an air filter for internal combustion engines having a primary air region and a secondary air region disposed within a housing. The primary air comes from air located outside the internal combustion engine while the secondary air comes from crankcase emissions flowing from a crankcase in the internal combustion engine to the air filter.

2. Description of the Prior Art

Various filters for reducing crankcase emissions are known an the art. For example, U.S. Pat. No. 5,125,940 to Stanhope, et al. discloses a venturi element 40 disposed outside of the downstream end of the housing 16 of the in-line air filter apparatus 10. Ambient air travels through tubular air filter 34, outside-in, and to the air intake hose 12 via the concave venturi element.

U.S. Pat. No. 5,562,746 to Raether discloses an air filter assembly 10 having a plurality of filters 32 mounted to side walls 17 via tube sheet structure 28. A concave venturi 70 is fixedly coupled to each filter 32 by means of the tube sheet structure 28 and the venturi flanges 88.

U.S. Pat. No. 4,272,263 to Hancock discloses a gas cleaning arrangement having a venturi sheet 4 disposed within a bag housing 1. Venturi sheet 4 supports a plurality of tubular filter arrangements 7 where each filter 7 includes a convex venturi 24, and accordingly the venturi is contained within housing 1.

U.S. Pat. No. 5,383,356 to Zurek et al. discloses a concave venturi 76 that is separately connected to the outside of the downstream end of housing 86 or may be integrated with the housing as a single unitary element.

U.S. Pat. Nos. 4,713,097 to Grawi et al 5,106,397 to Jaroszcyk, et al. and 5,120,334 to Cooper each disclose an air filter having a venturi, integrated with a housing, where the venturi is not adjacent to an air filter element.

U.S. Pat. Nos. 4,272,262 to Britt et al. 4,834,784 to Biganset, and 5,196,653 to Kiss disclose air filters with venturi elements.

The present invention is an improvement over the prior art, because none of the prior art shows an air filter device having a venturi element shaped to be contained completely within the body of the housing and positioned such that crankcase emissions flow from a secondary air region past the primary air region and out of the housing. In addition, the prior art does not disclose the venturi element described above that is fixedly attached to the downstream end of an air filter element.

SUMMARY OF THE INVENTION

The invention relates to an air filter comprising a filter housing and a filter element disposed within the housing. The filter is disposed on an engine air intake of an internal combustion engine. Inside the filter housing is a primary air region and a secondary air region. The primary air region is separated from the secondary air region via a barrier which is connected to a venturi element within the housing. A filter element is disposed within the primary air region to filter primary air flow and is shielded from the secondary air in the secondary air region via the barrier. In a first embodiment of the invention, the barrier is attached to the housing. In a second embodiment of the invention the barrier is attached to the filter. In a third embodiment of the invention, the barrier is not attached to either the filter element or the housing, rather it can be inserted into the housing before the filter is inserted into the housing.

This primary air region receives primary air from a source outside of the internal combustion engine. The secondary air region, also known as a crankcase ventilation chamber, is disposed within the housing and is designed to receive emissions from a crankcase while keeping these emissions separate from the primary air region. These crankcase emissions pass through the filter housing and then on to the internal combustion engine so that they undergo further combustion within the engine.

In an internal combustion engine, crankcase emissions are a result of gas escaping past a set of piston rings and into an engine crankcase due to high pressures in an engine's cylinder during compression and combustion. These escaped gases known as blowby gas, pass through the crankcase where they become contaminated with oil mist.

In an open crankcase ventilation system, the contaminated blowby is vented out of the crankcase, through the engine breather to the atmosphere. A closed crankcase ventilation system is one which by definition does not allow crankcase emissions (CCE) to be released into the atmosphere. This is typically accomplished by directing or recirculating the blowby gas back into the combustion process via the engine air intake. This is often referred to as an ingestive system. With the present invention, the air filter is designed for a closed crankcase ventilation system because it is designed to receive crankcase emissions into the crankcase ventilation chamber in the filter.

The goal of a closed crankcase ventilation system is to prevent the release of crankcase emissions to the atmosphere. This must be done in a way that does not affect engine performance and reliability. If oil mist in the CCE contaminates the critical engine components, such as turbo compressors, after coolers and valves, engine performance and reliability degrades over time and costly maintenance is incurred. Therefore, oil mist must be removed from CCE prior to introduction to the engine air intake. A filter or separator is typically used for this purpose. However, the filter or separator represents a resistance to air flow, which has the undesirable effect of increased engine crankcase pressure. In addition, the more effective this crankcase filter, the greater its change in pressure and crankcase pressure. To mitigate this unwanted effect, a source of enhanced vacuum is needed. A properly designed venturi in the combustion air flow filter can provide the required vacuum to overcome the crankcase filter drop in pressure and reduce the crankcase pressure.

To keep the crankcase from bleeding or weeping this filter must be designed to enhance the pressure drop or vacuum in the system to draw the secondary air flow out of the secondary air chamber.

For example, in one type internal combustion engine, primary air flows through a filter silencer to a compressor. The compressor is driven by a turbine. The turbine is driven by the exhaust gases emitted from the internal combustion engine.

Once the gases are compressed by the compressor, they flow into an after cooler which cools these compressed gases. Next, these gasses flow into an internal combustion engine where they aid in the combustion of the fuel allowing the internal combustion engine to operate. The exhaust gases are driven out of the internal combustion engine, through the turbine and out into the atmosphere. However, crankcase emissions flow to a crankcase filter for further filtration. This crankcase filter is designed to filter out oil while sending the additional gasses back into the secondary air region of the filter housing and onto the internal combustion engine for further combustion.

One object of the invention is to provide an air filter for receiving primary air for combustion from the crankcase.

Another object of the invention is to provide a connection for receiving crankcase emissions.

Another object of the invention is to place the secondary air region in the air filter in a space saving manner.

Another object is to provide enhanced vacuum at the crankcase emission connection.

Another object of the invention is for the secondary air region to act as a crankcase ventilation chamber designed to ventilate exhaust from an internal combustion engine's crankcase, thereby reducing crankcase pressure and engine weeping.

Another object of the invention is to have a crankcase ventilation chamber with a negative pressure to draw crankcase emissions out of the crankcase.

Still another object of the invention is to provide a venturi enclosed within a housing, downstream of the secondary air region to increase the negative pressure within the secondary air region.

Another object of the invention is to place the venturi within the housing in a space saving manner.

BRIEF DESCRIPTION OF THE DRAWINGS

Other objects and features of the present invention will become apparent from the following detailed description considered in connection with the accompanying drawings which disclose two embodiments of the present invention. It should be understood, however, that the drawings are designed for the purpose of illustration only and not as a definition of the limits of the invention.

In the drawings, wherein similar reference characters denote similar elements throughout the several views.

DETAILED DESCRIPTION OF THE PREFERRED EMBODIMENT

Figure 1A:
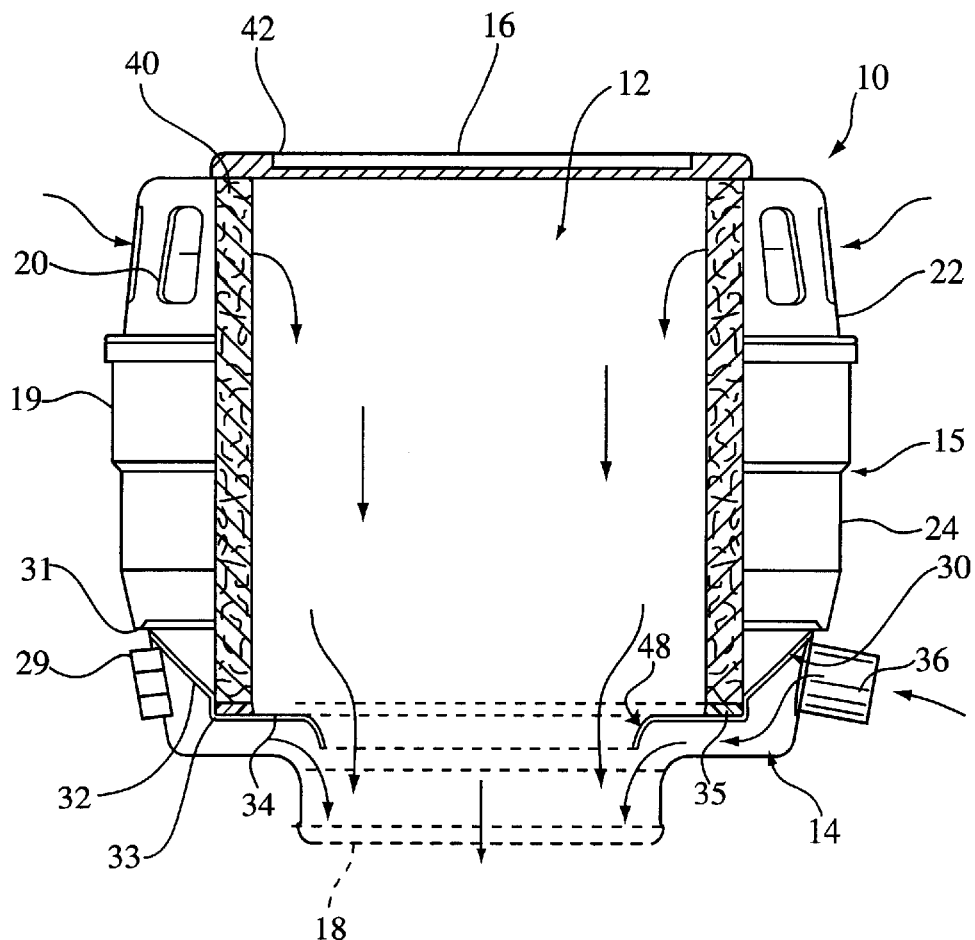
FIG. 1A is a cross-sectional view of the first embodiment of the air filter taken along the lines I—I in FIG. 4.
Figure 1B:
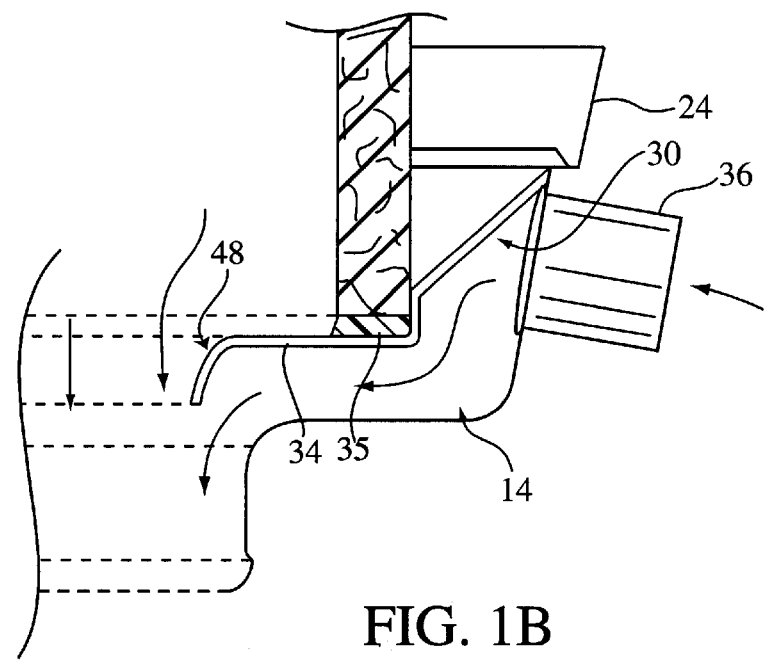
FIG. 1B is a close up view of the first embodiment of the air filter.

Referring to FIGS. 1A, and 1B there is shown a combination air filter 10 having a primary air region 12 and a secondary air region 14 formed within a housing 15. Housing 15, has a closed upstream end or endcap 16, an open downstream end 18, and sidewalls 19. Disposed on upstream portion 22, are a series of primary air intake holes 20. Primary air intake holes 20 are designed to allow primary air to flow into housing 15.

Figure 3A:
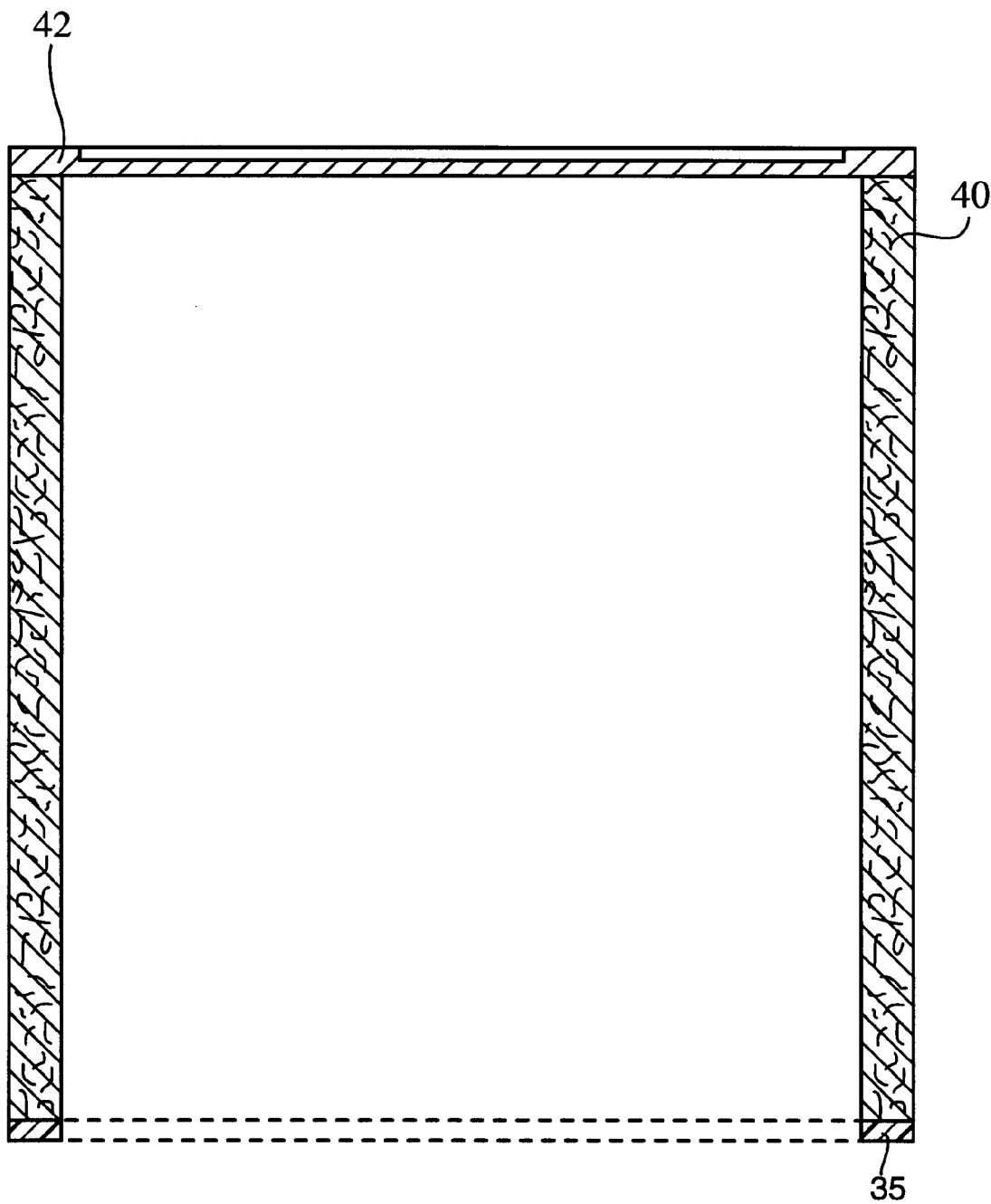
FIG. 3A is a cross sectional view of the first embodiment of the air filter element.

Filter housing 15 is comprised of two portions, an upstream portion 22 and a downstream portion 24. Upstream portion 22 is secured to downstream portion 24 a via series of clips 28 shown in FIGS. 4 and 5. Because upstream portion 22 can be separated from downstream portion 24, filter element 40 having a filter end cap 42 can be inserted into or removed from filter housing 15. Thus, if a filter element 40 as shown in FIG. 3A becomes dirty during use, new filter elements can be exchanged for old filter elements.

In this first embodiment, primary air region 12 receives air from outside an engine. This air flows through primary air intake holes 20, through filter element 40 and into primary air region 12. In addition, air fluid or emissions flowing from an engine's crankcase flows through secondary air intake hole 36 and into secondary air region 14. Air flowing through primary air region 12 is separated from secondary air region 14 by barrier 30. Filter element 40 is supported by barrier 30 and seals against barrier 30 to prevent unfiltered air from entering primary air region 12.

Barrier 30 is connected to sidewall 19 of housing 15 at seal point 31, and in barrier region 32 it extends diagonally along filter element 40 to bend point 33 where barrier 30 bends to form a flange 34. Filter element 40 rests on flange 34 so that a seal is formed between element 40 and barrier 30. Filter element 40 contains a rubber seal 35 that is used to support filter 40 on a bottom rim.

In addition, when upstream portion 22 is placed on downstream portion 24, endcap 16 pushes filter element 40 and rubber seal 35 onto flange 34 so as to form a substantially airtight seal between filter element 40 and endcap 16 at the upstream end and, rubber seal 35 and flange 34 on the downstream end. As shown in FIGS. 1A and 1B, the seal between filter element 40 and barrier 30 is radial. Thus, if primary air is pulled into housing 15 it is forced to go through filter element 40 and then onto primary air region 12.

Primary air in primary air region 12 flows downstream and out of downstream end 18. As primary air is flowing, it flows past barrier 30 and venturi 48. Venturi 48 causes primary air flow to flow into first a smaller region and next, into a slightly larger region. This type air flow causes an area of low pressure at the minimum diameter of the venturi rim 48 which also defines the outlet of the secondary air region within the system. Thus, as the negative pressure increases in the vicinity of venturi 48 it helps to draw secondary air out of the secondary air region 14 and out of downstream end 18. In addition there is also a pressure drop or a corresponding increase in negative pressure in secondary air region 14.

If secondary air region 14 is functioning as a crankcase ventilation chamber, ventilating crankcase emissions from an internal combustion engine, the increased negative pressure in the system helps to draw these crankcase emissions out of a crankcase. Furthermore, because venturi 48 forms the outlet of secondary air region 14, the pressure drop occurs first in the primary air region, creating a vacuum for the secondary air in secondary air region 14. This is because when venturi 48 narrows this opening, it creates increased velocity in the primary air through venturi 48 which causes low pressure at the outlet of the secondary air region.

Figure 2A:
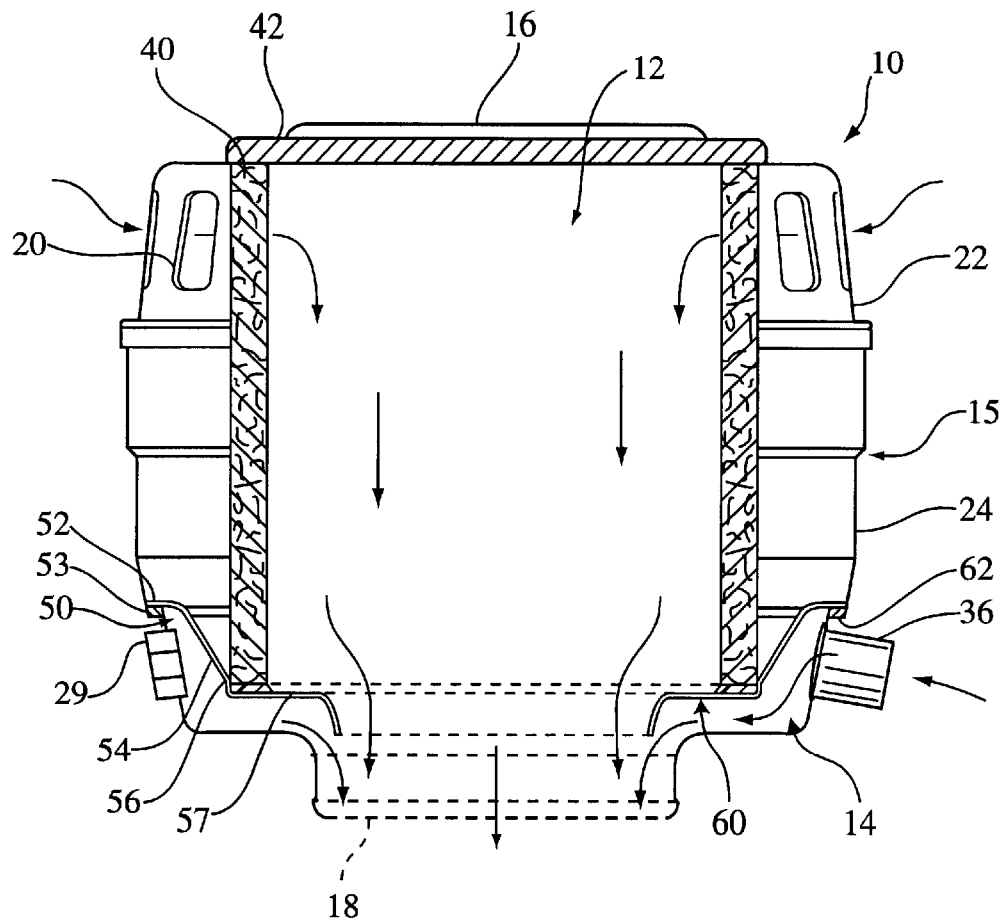
FIG. 2A is a cross-sectional view of the second or third embodiment of the air filter taken along the lines I—I in FIG. 4.
Figure 2B:
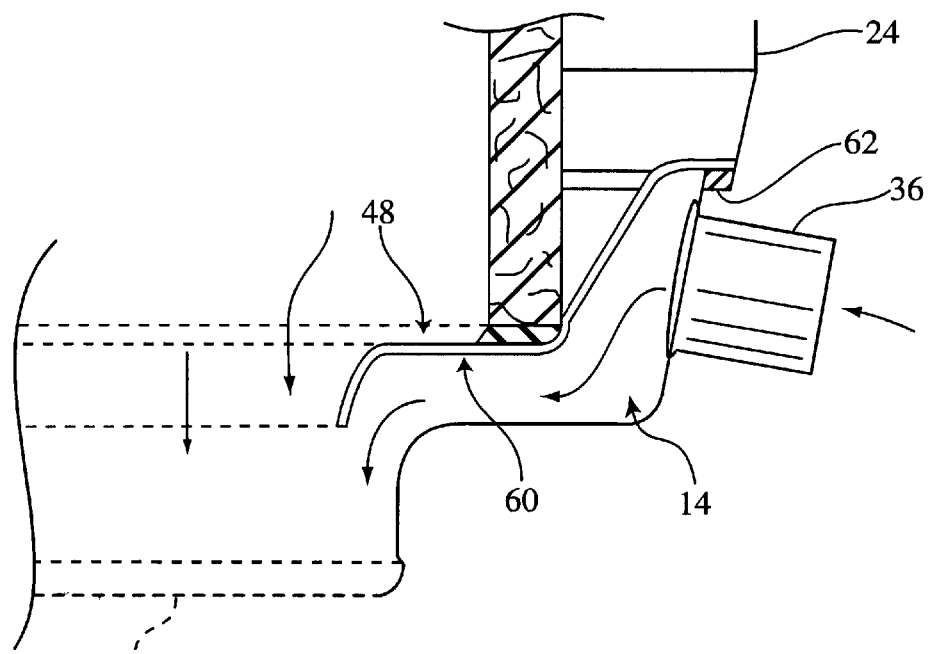
FIG. 2B is a close up view of the second or third embodiment of the air filter.
Figure 3B:
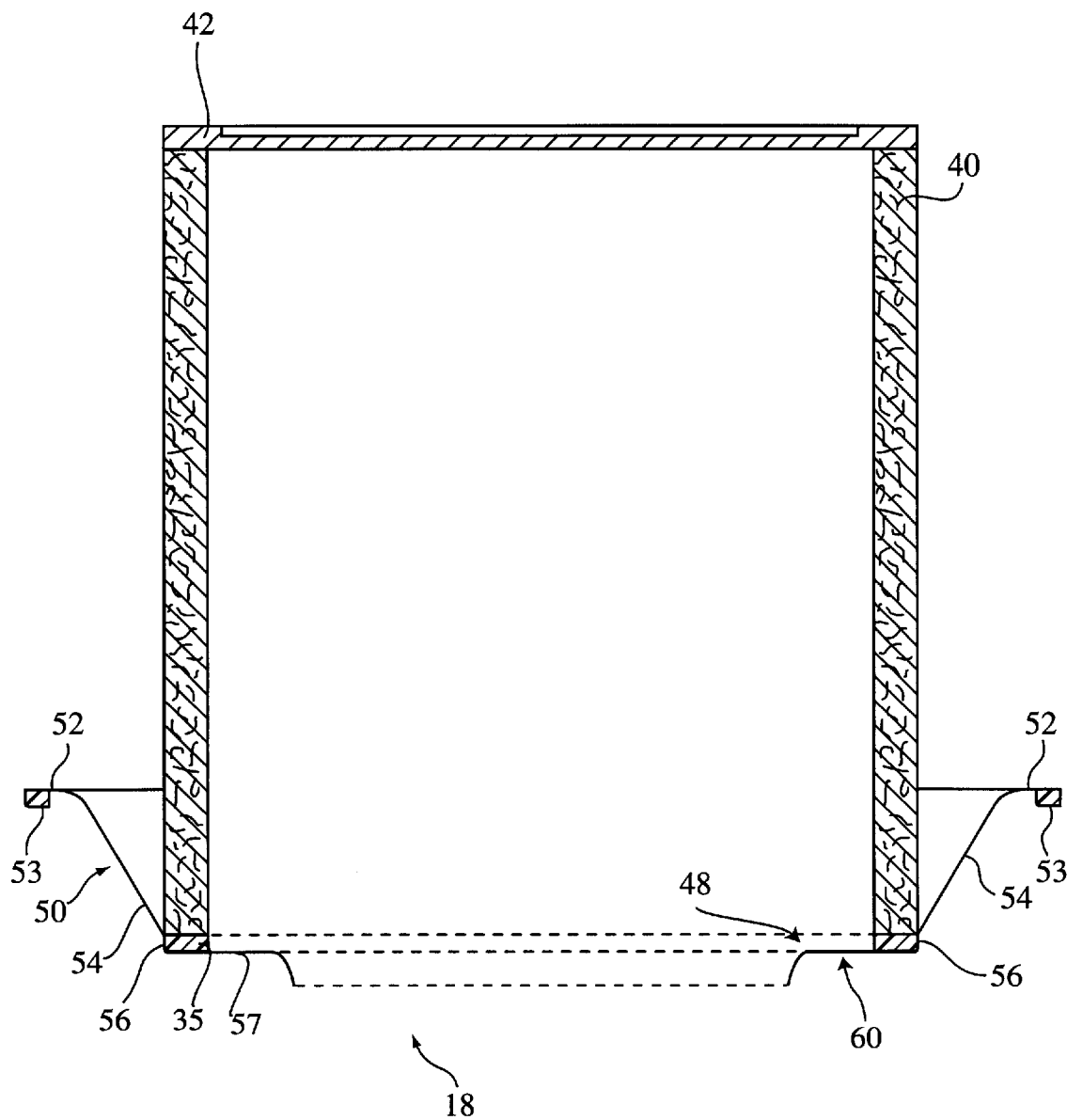
FIG. 3B is a cross sectional view of the second embodiment of the air filter element.

FIGS. 2A and 2B show a second or third embodiment of the invention wherein there is a barrier between primary air region 12 and secondary air region 14 which is attached to filter element 40. In this second embodiment, also shown in FIG. 3B, barrier 50 is attached to filter element 40 as part of an end piece adapter 60. In a third embodiment of the invention the filter rests upon barrier 50 after it is placed within housing 40.

Barrier 50 comprises a flange 52 resting on a rubber seal 53 inside housing 15. Extending down from flange 52 is barrier wall 54, which extends down to seal point 56 wherein barrier 50 then flattens out into flange 57 to form venturi 48. In this case elements 50, 52, 54, 56 and 57 all form end piece adapter 60 and are all one part and this one part structure is used to keep secondary air from mixing with primary air in primary air region 12.

Thus, in both the second and third embodiments, filter element 40 is placed inside housing 15 so that when upstream portion 22 is placed on downstream portion 24, endcap 16 presses down on filter element 40 so that flange 52 presses down on rubber seal 53. Rubber seal 53 is supported on its downstream end by rim 62. extending around an inside region of housing 15. Thus, filter element 40 is kept free from secondary air at the upstream end of secondary air region 14, by compression on rubber seal 53, and also at its downstream end by the attachment of barrier wall 54 to end piece adapter 60.

Figure 4:
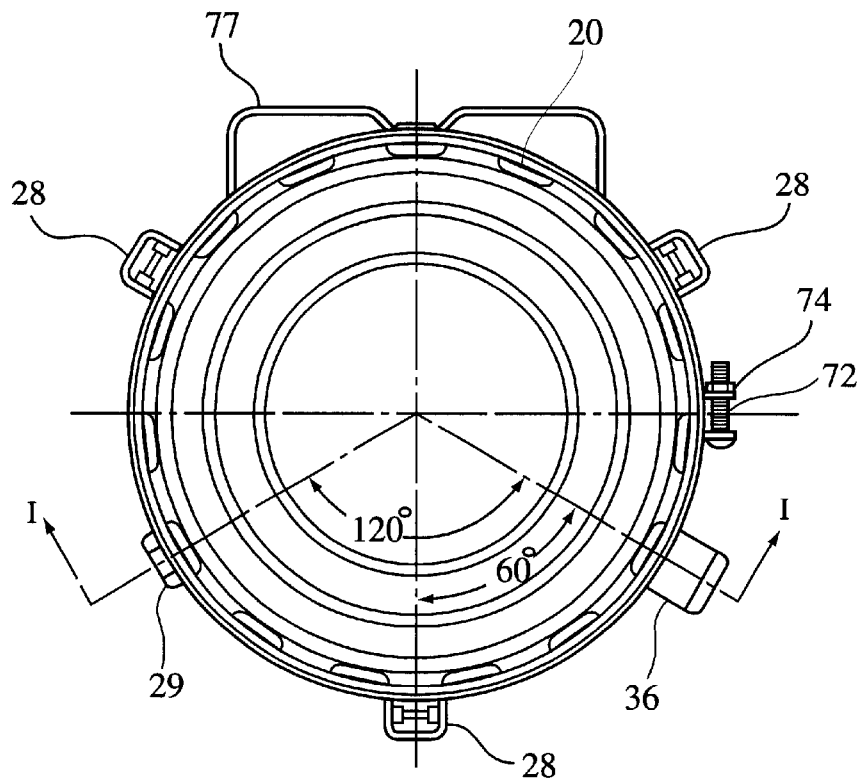
FIG. 4 is a top view of the air filter.
Figure 5:
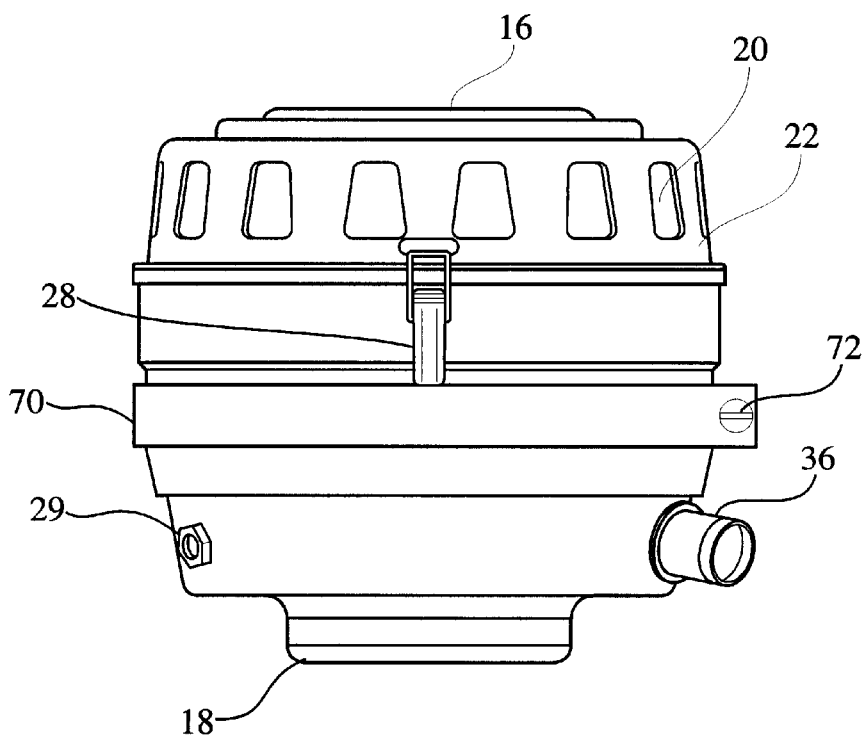
FIG. 5 is a side view of the air filter device.

FIGS. 4 and 5, show a top and side view of housing 15. In this embodiment, there is shown a series of clips 28 used to clamp upstream portion 22 to downstream portion 24. In addition, a clamping ring 70 is disposed on downstream portion 24 via a bolt 72 and nut 74 which tightens clamping ring 70 onto downstream portion 24. Clamping ring 70 is designed to hold bracket 77 so that bracket 77 is used to fix housing 15 to a stable block (not shown). In this case, clamping ring 70 and bracket 77 both form one part used to support filter 10 inside an engine compartment.

Figure 6:
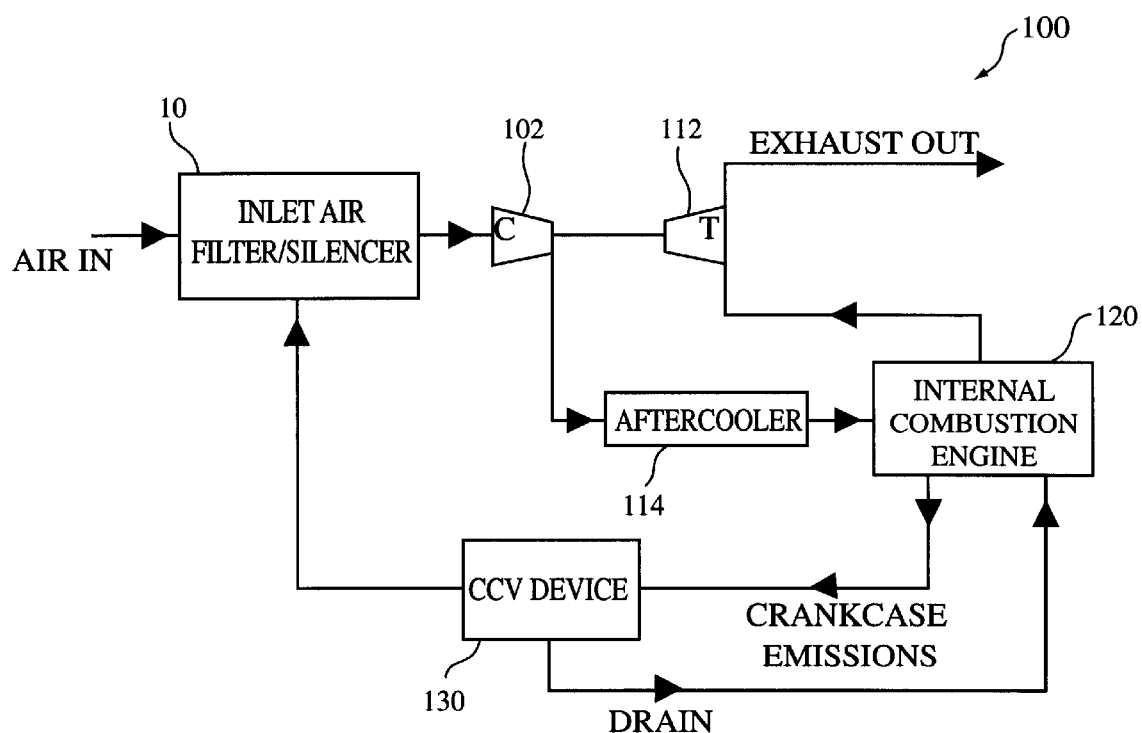
FIG. 6 is a schematic diagram of the closed crankcase ventilation air filter system for an internal combustion engine.

FIG. 6 shows a block diagram of an internal combustion engine/exhaust system 100 showing an inlet air filter device 10 for receiving air into the system. Connected to intake air filter device 10 is compressor 102 which draws air into the system. Compressor 102 is driven by turbine-turbocharger 112. The intake air flows from the compressor into after cooler 114. Air next flows from after cooler 114 and on into internal combustion engine 120. With the combustion in internal combustion engine 120, emissions flow from internal combustion engine 120 and into turbine 112. These emissions power turbine 112 which drives compressor 102 and next flow out to the exhaust system.

If the piston ring seal is faulty, and there is any misfiring within the engine or blowback, pressure and combustion from the internal combustion engine enters into the crankcase causing crankcase emissions. These crankcase emissions can be harmful to the environment so in many cases they are filtered out before they enter into the atmosphere. In the present case, crankcase emissions flow through crankcase ventilation device 130 where oil is filtered back into the crankcase. The remainder of these emissions are sent to the crankcase chamber or secondary air region 14 in air filter 10.

In operation, air is drawn into filter 10 by compressor 102. Compressor 102 pulls air through air filter device 10 so that as shown in FIGS. 1 and 2, air is pulled down through openings 20 and through venturi 48 and out downstream end 18. Next, air passes onto after cooler 114 where it is fed into internal combustion engine 120 for combustion. Because venturi 48 is situated in housing 15, this reduces the pressure in the discharge of primary air out of downstream end 18. This feature is important because venturi 48 provides negative pressure in the crankcase ventilation chamber 14 and also in the crankcase itself which keeps the crankcase from bleeding either oil or additional combustion. Thus, by combining a primary air filter, a crankcase ventilation chamber 14, and a venturi 48 in one housing 15, this design saves space, and also provides necessary negative pressure to the crankcase.

While a few embodiments of the present invention have been shown and described, it is to be understood that many changes and modifications may be made thereunto without departing from the spirit and scope of the invention as defined in the appended claims.

What is claimed is:

1. An air filter for an internal combustion engine comprising:
    a) a housing having an upstream end, a substantially open downstream end, at least one primary air intake hole and at least one secondary air intake hole;
    b) primary air region disposed within said housing for receiving primary air from said at least one primary air intake hole;
    c) a secondary air region disposed within said housing for receiving secondary air from said secondary air intake hole;
    d) a barrier disposed within said housing, said barrier separating said primary air region from said secondary air region, said barrier separating primary air flow from secondary air flow wherein said barrier is insertable into and removable from said housing;
    e) a filter element disposed within said primary air region, said filter element filtering out particles in said primary air as it passed from said at least one primary air intake hole to said substantially open downstream end; and
    f) a venturi disposed within said housing adjacent to said downstream end, so that when primary air flows past said venturi there is a pressure drop in this primary air creating a vacuum pull of air from said secondary air region.

2. The air filter as claimed in claim 1, wherein said barrier is attached to said filter element.

3. The air filter as claimed in claim 1, wherein said secondary air region receives crankcase exhaust sent from a crankcase in an internal combustion engine to the filter.

4. The air filter as claimed in claim 1, wherein said open downstream end is connected to an internal combustion engine so that said engine pulls air through said at least one primary air intake hole and said at least one secondary air intake hole, through said primary air region and said secondary air region respectively, down through said open downstream end.

5. An air filter for an internal combustion engine comprising:
    a) a filter element portion having an upstream end and a downstream end; and
    b) a filter housing for housing said filter element;
    c) a barrier attached to said downstream end of said filter element portion, said barrier forming a primary air region and a secondary air region within said housing, wherein said barrier separates a primary air flow from a secondary air flow.

6. The air filter as claimed in claim 5, wherein said barrier further comprises a venturi so that when primary air flows past said venturi, there is a pressure drop in this primary air creating a vacuum pull of air from said secondary air region.

7. The filter as claimed in claim 5, wherein said barrier comprises a flange region for attaching to said housing a shield region, for separating primary and secondary air regions for receiving and attaching to said filter material and a venturi region.

8. The filter as claimed in claim 7, wherein said housing has an upstream end, an open downstream end, and an internal rim formed within said housing, wherein when said filter element is inserted into said housing, and said housing is closed, said closed upstream end pushes on said filter element so that said flange region presses down on top of said internal rim, forming a seal between said primary air region and said secondary air region, while said flange region supports said filter element portion spaced above said downstream end of said housing so as to form said secondary air region while keeping said filter element portion shielded from said secondary air region.

9. A housing for a filter element comprising:
   a) a primary air region formed within said housing for housing a filter element;
   b) a secondary air region formed within said housing separate from said primary air region; and
   c) a barrier separating said primary air region from said secondary air region, said barrier formed integral with said housing, wherein said barrier has a first flat portion for supporting said filter thereon, and a sloped portion for separating said primary air region from said secondary air region wherein the filter element rests on the barrier inside the housing.

10. An internal combustion engine having an air intake, an exhaust, a block enclosing a crankcase and a crankcase outlet or breather comprising the engine having a filter comprising:
    a) a filter element having an upstream end and a downstream end;
    b) a filter housing having an upstream end and an open downstream end, at least one primary air intake hole and at least one secondary air intake hole;
    c) a primary air region within said housing for receiving primary air from said primary air intake hole;
    d) a secondary air region within said housing for receiving secondary air from said secondary air intake hole;
    e) a barrier inside said housing for separating said primary air region from said secondary air region, wherein said barrier is insertable into and removable from said housing; and
    f) a venturi disposed within said housing so that said primary air can drop in pressure upstream of said secondary air region so that said secondary air is drawn out of said secondary air region from this drop in pressure.

11. A filter being insertable into a filter housing, the filter comprising:
    a) a filter portion designed to filter particles out of an incoming air stream;
    b) a barrier connected to said filter portion, said barrier for dividing the filter housing into at least two regions; and
    c) a venturi connected to said filter portion and said barrier portion wherein said venturi creates a pressure drop in said housing when said incoming air stream flows past said venturi.

12. The filter as in claim 11, wherein the filter is enclosed within the housing and contacts the housing at a first end and a second end so that the filter is sealed within the housing.

13. The filter as in claim 11, wherein the filter housing further comprises a rim, and said barrier further comprises a flange extending out from said barrier, wherein said flange is supported on said rim in the filter housing so that the filter is supported in the filter housing.

14. The filter as in claim 13, wherein the filter further comprises a seal connected to said flange wherein said seal is disposed between said flange and the housing when the filter is inserted into the housing.

15. The filter as in claim 11, wherein said barrier further comprises a seal point at which said barrier bends to receive said filter portion of the filter.

16. A barrier for a filter housing being insertable into and removable from the filter housing, the barrier comprising:
    a) a flange region for contacting a rim on the filter housing;
    b) a barrier region extending out from said flange region, said barrier region for dividing the filter housing into at least two separate air flow regions; and
    c) a venturi region connected to said barrier region, for acting as a venturi to reduce an air pressure caused by an air flow within the housing.

* * * * *